Figure 1:
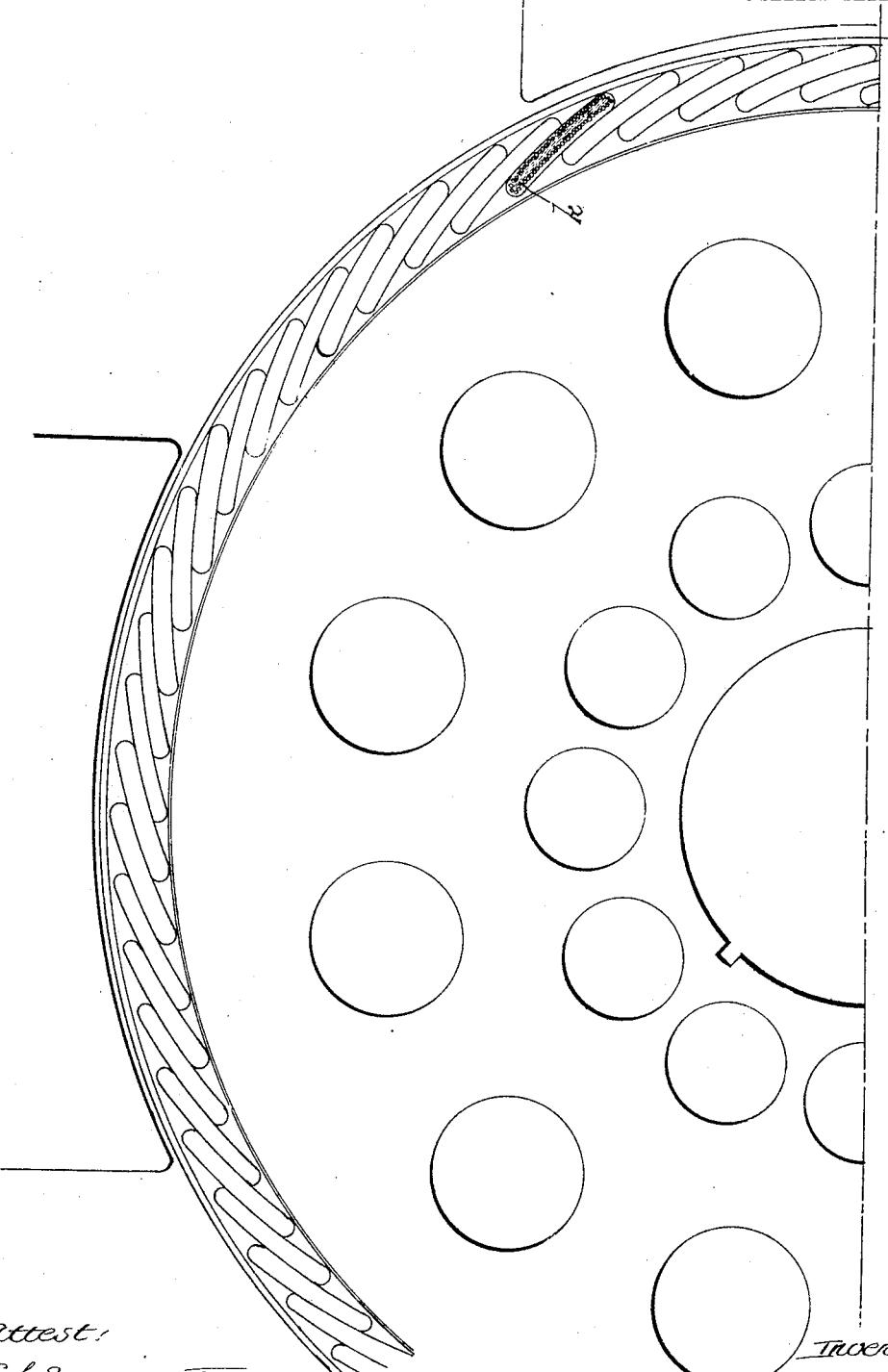

No. 782,463. PATENTED FEB. 14, 1905.
C. A. PARSONS.
CONDUCTOR FOR THE ARMATURE WINDINGS OF DYNAMO ELECTRIC MACHINES.
APPLICATION FILED OCT. 1, 1902.

5 SHEETS—SHEET 1.

No. 782,463. PATENTED FEB. 14, 1905.
C. A. PARSONS.
CONDUCTOR FOR THE ARMATURE WINDINGS OF DYNAMO ELECTRIC MACHINES.
APPLICATION FILED OCT. 1, 1902.
5 SHEETS—SHEET 2.
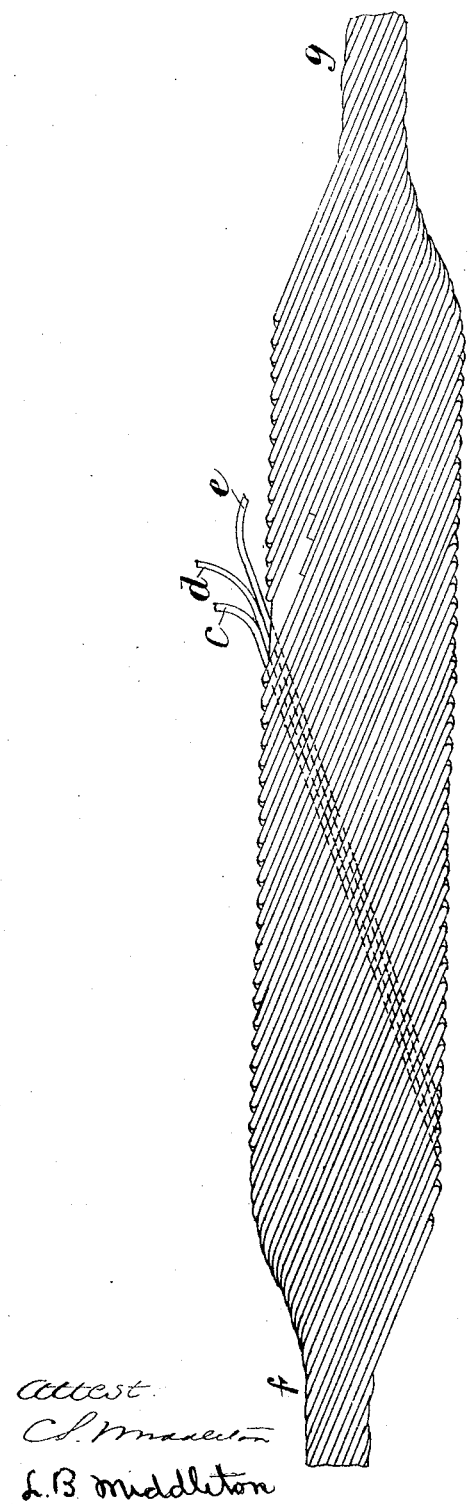
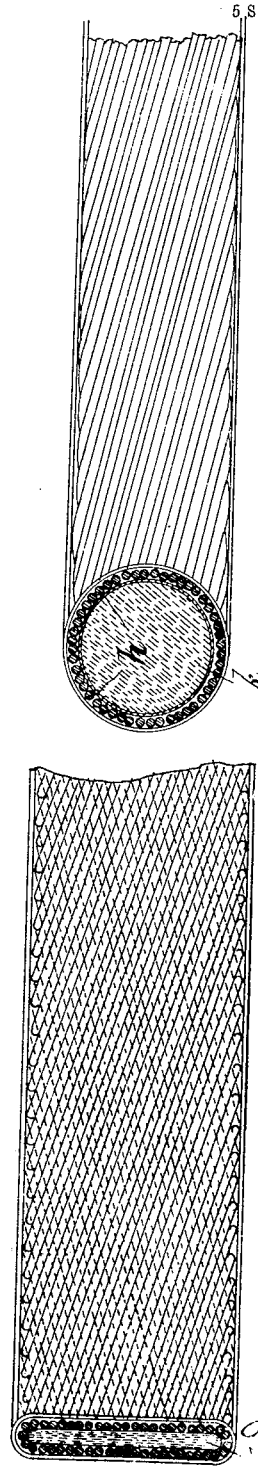

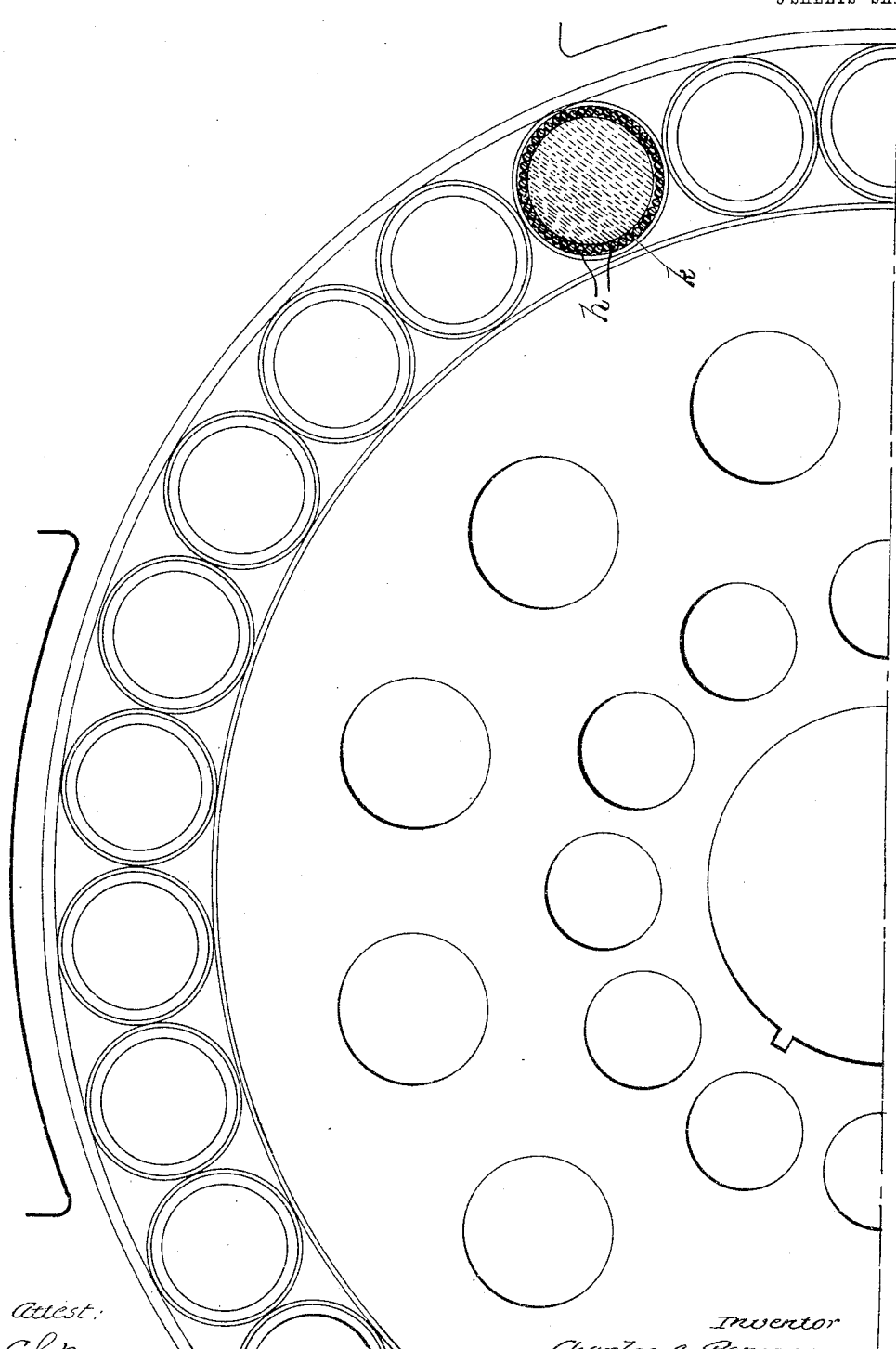

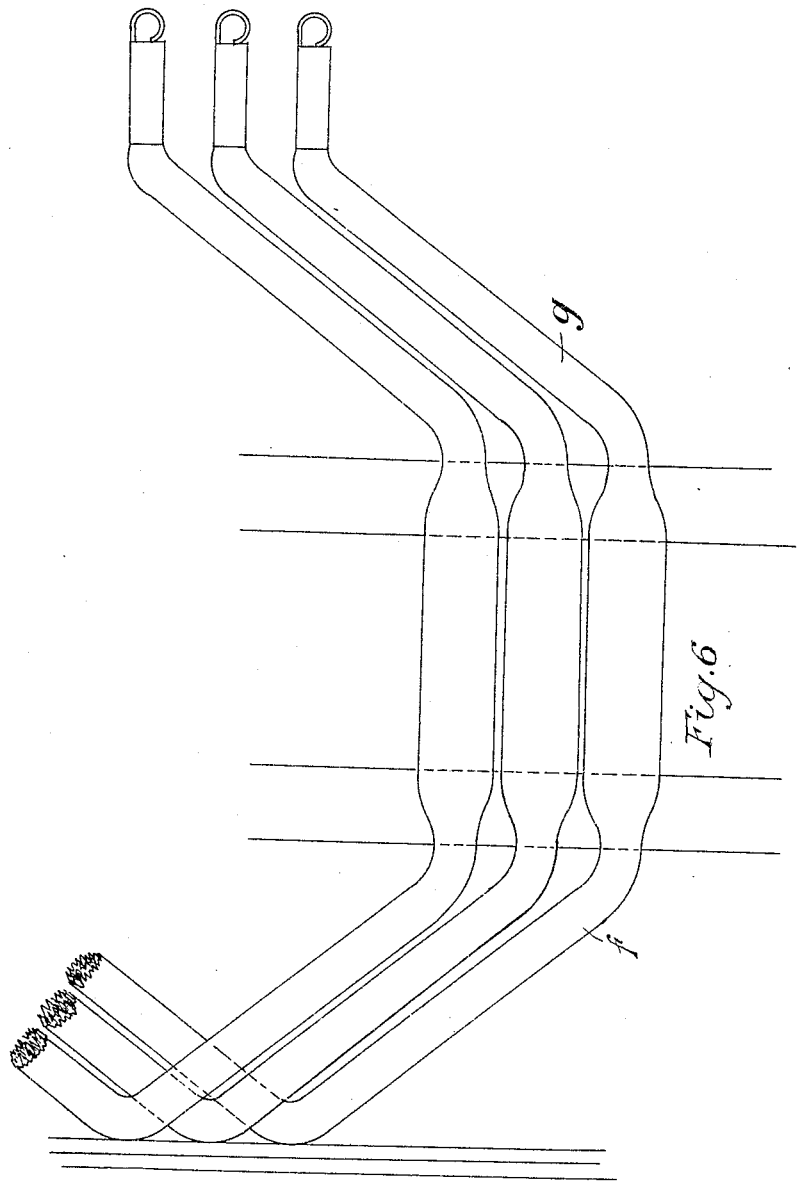

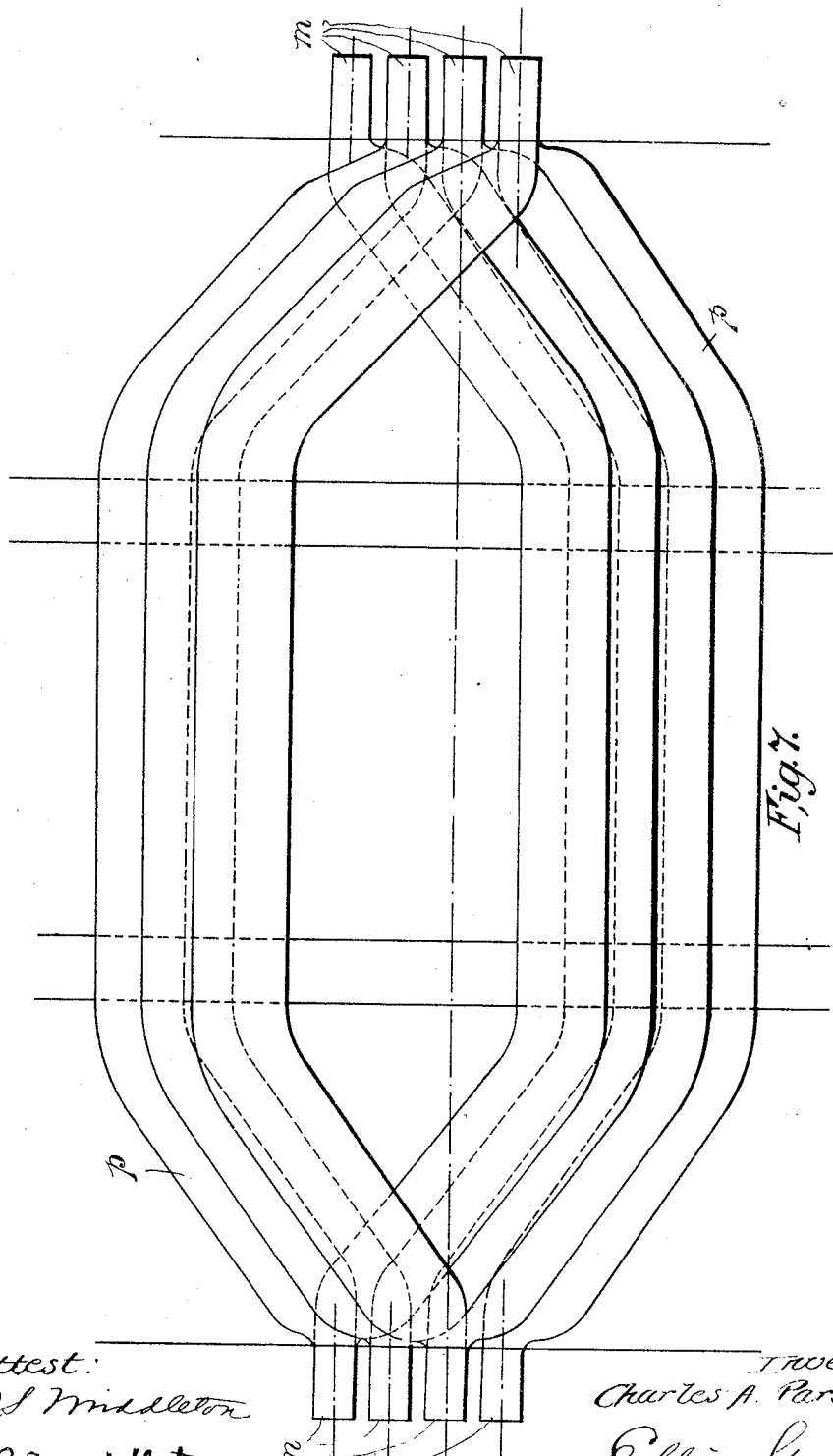

No. 782,463.                                    Patented February 14, 1905.

UNITED STATES PATENT OFFICE.

CHARLES ALGERNON PARSONS, OF NEWCASTLE-UPON-TYNE, ENGLAND.

CONDUCTOR FOR THE ARMATURE-WINDINGS OF DYNAMO-ELECTRIC MACHINES.

SPECIFICATION forming part of Letters Patent No. 782,463, dated February 14, 1905.

Application filed October 1, 1902. Serial No. 125,565.

*To all whom it may concern:*

Be it known that I, CHARLES ALGERNON PARSONS, engineer, a subject of the King of Great Britain and Ireland, residing at Heaton Works, Newcastle-upon-Tyne, England, have invented certain new and useful Improvements in Conductors for the Armature-Windings of Dynamo-Electric Machines, (for which I have made application for Letters Patent in Great Britain, No. 5,374, bearing date March 4, 1902,) of which the following is a specification.

This invention relates to the windings of dynamos, motors, and the like.

The object of this invention is to reduce the sparking which takes place, for example, at the brushes of continuous-current dynamos. I have found that this sparking is chiefly determined by the induction incidental to the commutation of the current under the brushes, or, in other words, the energy required to divert the flow in a very short interval of time from one section of the armature-winding to its neighbor. I have also found experimentally by plotting the graduation of potential around the commutator-brushes that the rate of graduation is closely related to the induction of commutation and indicates the amount of sparking. I have also found by experiment that by surface-winding an armature with a conductor of thin flat cross-section and formed of insulated strands having a lay of one complete turn or two or more complete turns in the length of the core of the armature the induction of commutation and sparking are largely reduced and that the spiral lay, even in a very widely-extended thin and flat conductor, prevents all tendency to local currents in the copper.

My invention consists generally in so forming and disposing armature-conductors as to reduce the induction of commutation and consequent sparking to a minimum.

The accompanying drawings illustrate my invention, Figure 1 being a view of an armature wound with conductors constructed according to my invention, one of the conductors being shown in section. Fig. 2 is an outside view of a conductor constructed according to my invention. Fig. 3 is a sectional elevation of the flattened part of the conductor shown in Fig. 2. Fig. 4 is a similar view to Fig. 3 and shows a tubular conductor in which the wires are spirally wound on a spiral weft or core of opposite hand to the winding of the wires. Fig. 5 is a view of a surface-wound armature in which the conductors are of the form shown in Fig. 4, one of the conductors being shown in section. Figs. 6 and 7 show methods of connecting the conductors.

In carrying my invention into effect according to one form—as applied, for example, in the case of a drum-wound armature—a flat section of conductor is preferably maintained throughout the whole armature, Fig. 7, &c., including the end windings; but in some cases the strands may be gathered into a circular, oval, or other form $f$ $g$, Fig. 2 and Fig. 6, at the ends beyond the armature-core for facility in winding, the induction of conductors not in the immediate neighborhood of iron being less. I find that there is no difficulty in winding such a flat conductor on an armature, provided that it is suitably woven or otherwise constructed with or without a flat core of some flexibility. Such a conductor can be easily curved round the ends $p$ $p$, Fig. 7, doubled over at $m$ and brought back on the reverse spiral, again turned along the core, and similarly formed at the other end. Multiple coils of this description can also be used instead of single coils, as above described, when so required for high voltages. I sometimes use a tubular conductor $h$, Figs. 4 and 5, formed of insulated strands of copper spirally wound for an integral number of turns round a core of cotton, hemp, or other suitable material $k$, in which strands or ribbons of magnetic or non-magnetic material may be inserted, which has the effect of reducing the self-induction in a similar manner to that above described. I may also form the conductor of any other equivalent form to secure the lowest induction of commutation. The conductor I may manufacture in various ways. In one case the strands, previously insulated or uninsulated, are woven in a braiding-machine of ordinary construction, the conductor forming the spiral warp of the desired pitch and the weft being an opposite spiral of thin cotton, hemp, or other suitable material. It may be woven in a thin oval or flat form; but I generally prefer to weave it in a tubular form and afterward to flatten the tube more or less. At any period of the flattening process a core of any suitable thickness or material can be inserted. For example, a tube of insulating material might be employed of any suitable material.

Instead of one spiral of insulated conductors I may have two lays in the same or opposite directions, preferably with a layer of insulating material between the lays, or other arrangement of lays or arrangement of conductors and insulating material, provided that such strands $c$, $d$, and $e$ have a suitable number of complete turns, spirals, convolutions, or plaits or other symmetrical path in the length of the core and are properly insulated, so as to prevent local currents. Another method of manufacture is to lay or wind the strands round a thin tube of suitable insulating material, which may, for example, be paper spirally wound. The conductors are then taped up and varnished, the cylinder carrying the tube being subsequently removed and the whole flattened to form the armature-strip. Such conductors can be laid on a smooth-turned core, or the core may be milled or grooved with teeth in any suitable way for the reception of the edges of the conductors.

Having now described my invention, what I claim as new, and desire to secure by Letters Patent, is—

1. In dynamo-electric machines of the continuous-current type, a surface-wound armature having conductors made of strands spirally wound or plaited around a solid core for a complete number of turns in the length of the armature, substantially as described.

2. In dynamo-electric machines of the continuous-current type, a surface-wound armature having conductors made of strands spirally wound around an insulating-core for a complete number of turns in the length of the armature and of flattened cross-section where they pass in close proximity to the body of the armature, substantially as described.

3. In dynamo-electric machines of the continuous-current type, a surface-wound armature having conductors of flattened cross-section and made of strands spirally wound or plaited around an insulating-core for a complete number of turns and wound on the armature with each conductor overlapping the adjacent one, substantially as described.

4. In dynamo-electric machines of the continuous-current type, a surface armature-winding, each conductor composed of separately-insulated strands, such strands being neutrally disposed far apart to reduce self-induction and having a general spiral or symmetrical series of convolutions of an integral number of turns in the length of the core, substantially as and for the purpose set forth.

5. In dynamo-electric machines of the continuous-current type, a surface-wound armature having conductors of tubular form and made of strands spirally wound around a solid core for a complete number of turns in the length of the armature, substantially as described.

In witness whereof I have hereunto set my hand in presence of two witnesses.

CHARLES ALGERNON PARSONS.

Witnesses:
   HENRY G. DAHYNS, Jr.,
   WILLIAM M. JOHNSTON.